United States Patent [19]

Granborg

[11] Patent Number: 5,266,773
[45] Date of Patent: Nov. 30, 1993

[54] HEATING DEVICE FOR VEHICLE OPERATIONAL PARTS

[76] Inventor: Bertil S. M. Granborg, 312 Poopoo Pl., Kailua, Hi. 96734

[21] Appl. No.: 544,319

[22] Filed: Jun. 27, 1990

[51] Int. Cl.$^5$ ............................................. H05B 1/02
[52] U.S. Cl. ................................. 219/202; 219/10.57; 219/204; 219/494
[58] Field of Search ...................... 219/10.57, 202, 204, 219/494, 505, 10.63, 10.75

[56] References Cited

U.S. PATENT DOCUMENTS

| | | | |
|---|---|---|---|
| 3,263,063 | 7/1966 | Marriott et al. | 219/10.57 |
| 3,469,072 | 9/1969 | Carlson | 219/202 |
| 3,922,415 | 11/1975 | Dexter | 219/202 |
| 4,081,737 | 3/1978 | Miyahara | 219/202 |
| 4,585,178 | 4/1986 | Arzt | 219/202 |
| 4,667,781 | 5/1987 | Lilley et al. | 219/202 |
| 4,845,329 | 7/1989 | Vaz et al. | 219/203 |

Primary Examiner—Mark H. Paschall
Attorney, Agent, or Firm—Thomas J. Tighe

[57] ABSTRACT

A source of electrical energy travels along with a vehicle the control elements of which are to be warmed so as to prevent or inhibit icing. The electrical energy is transformed to primarily current in a closed conductive loop. Preferably, the current is induced into the loop by a transformer. The loop comprises at least in part joint segments comprising at least portions of the vehicle's brakes and/or control linkages to be warmed. The amount of current is sufficient in relation to the inherent resistivity of the segments to cause the generation of heat within the segments. Preferably the current is an alternating current of a frequency which causes a majority of the current to travel through the segments on, at, or near the skin of the segments in order to cause the generation of heat to be primarily around the skin of the segments.

12 Claims, 2 Drawing Sheets

HEATING DEVICE FOR VEHICLE OPERATIONAL PARTS

BACKGROUND OF THE INVENTION

1. Field of the Invention

This invention relates to devices for using the inherent resistivity of electrically conductive parts of a vehicle, e.g. operational control parts such as the brakes and control linkages, to generate heat in order to assist in keeping the parts operable in an ambient environment that tends to cause the parts to become inoperable due to icing.

2. Description of Related Art

While this invention can be used to prevent freeze-up due to icing of the brakes and other operational control parts of any type of vehicle having a sufficient source of electrical energy, such as automobiles, trucks, airplanes, helicopters, and railroad trains, the following discussions will focus on railroad train braking systems for illustration purposes only.

There are presently three basic brake systems for railroad cars. One system consists of block brakes, where the brake action is performed by cast iron blocks applied to the rolling surface of the wheels themselves. The second system consists of disc brakes, where two brake pads squeeze the wheel from each side to perform the brake action. A variation of this system is to have separate discs mounted on the shaft to which the brake pads are applied. The third system uses brake pads applied directly to the rail. This is mostly used for emergency braking. The latter two systems are also found in road vehicles and aircraft wheels.

All brakes operate with the principle of converting kinetic energy into heat for retardation of the vehicle. Most modern railroad cars also have anti-locking systems based on mechanically, electronically or microprocessor controlled devices.

All these systems appear to function well except in temperatures at or below freezing, i.e. less than 0° C., in the presence of moisture. In such an environment the brakes tend to lock due to ice that is formed by condensation and/or precipitation, snow, ice and freezing of moisture on different parts of the bogie. To solve this problem, the following heating system is suggested to either prevent the ice from forming on vital parts or to prevent two parts from freezing together.

SUMMARY OF THE INVENTION

This invention presents a device for generating heat in an electrically conductive part of a vehicle, such as the metal parts of the vehicle's brakes and metal linkages, comprising a means for inducing an alternating current through said part, the induced current being sufficient in relation to an inherent resistivity of said part to generate a desired amount of heat. Ordinarily the desired amount of heat will be that amount sufficient to prevent icing under the circumstances. The frequency of the alternating current can be high enough to cause at least a majority of the current to be disposed on and proximate the surface of said part for more efficient operation. The means for inducing the alternating current can be a source of alternating voltage which travels along with said vehicle, and means for transforming the alternating voltage into said alternating current comprising an electrical transformer, the alternating voltage being applied to a primary winding of said transformer and the vehicle part being serially within an electrical loop of a secondary winding of the transformer.

An object of this invention is to provide a means for generating heat within the components of a vehicle braking system without any external heating elements, such as heating coils and the like.

An object of this invention is to provide a means for generating heat within the components of a vehicle's operational control linkages without any external heating elements, such as heating coils and the like.

Further objects of this invention will be discussed and/or will be readily discernable from of reading of the specification and claims herein.

DESCRIPTION OF THE PREFERRED EMBODIMENTS

Figure 1:
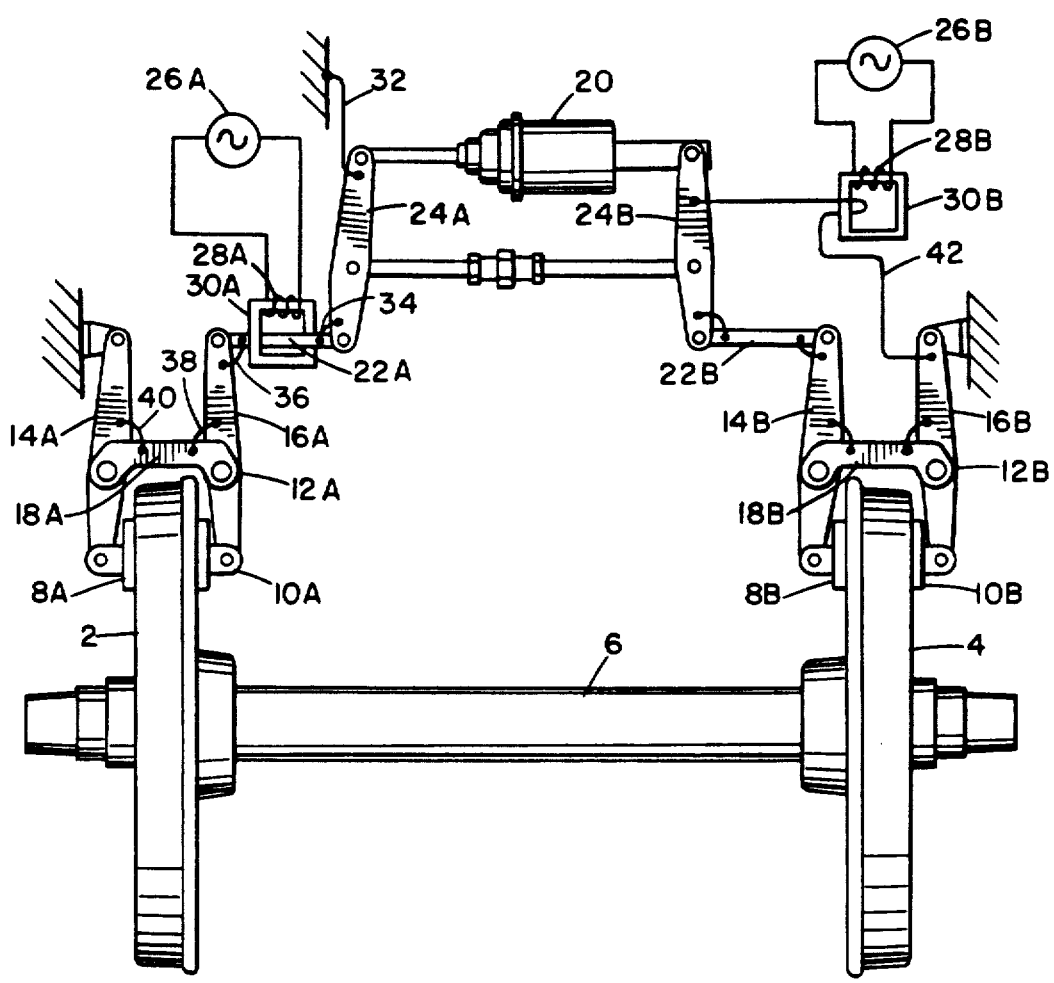
FIG. 1 illustrates two configurations for this invention as applied to disc-braked wheels.

Referring to FIG. 1, it depicts one type of disc brake and two different ways to connect this invention. A pair of railroad car wheels, 2 and 4, are connected by axle 6. Each wheel is illustrated as having a braking means associated with it comprising a pair of opposing friction pads, 8A and 10A, and 8B and 10B for the left and right wheels, respectively. The friction pads are selectively applied to the wheels by means of metal calipers, 12A and 12B. The calipers each comprise two metal levers, and for the left and 14B and 16B for the right, pivotally engaged with a metal fulcrum piece, 18A and 18B, to apply the friction pads to their associated wheels in pincer fashion. Typically one of the levers of each caliper (e.g. 14A and 16B respectively) is held in a fixed position while the other lever (e.g. 16A and 14B respectively) is pivoted about its fulcrum by an hydraulic ram 20 (commonly called a "brake cylinder") through first and second metal coupling linkages, 22A and 24A, respectively, for the left and 22B and 24B, respectively, for the right.

Referring again to FIG. 1, an embodiment of this invention is illustrated to comprise an alternating voltage source 26A with a two lead output that is electrically connected to a primary winding 28A of a step-down transformer 30A. The voltage source can be one or more generators turned by the wheels themselves, a generator turned by engine, or any alternating voltage source of suitable capacity as suitability is defined in this specification. The secondary winding is illustrated as being a single electrically conductive loop comprising: a first conductive wire 32 connecting the first linkage 24A to a chassis ground; a second conductive wire 34 ensuring that electrical continuity is maintained between the first linkage and the second linkage 22A; a third conductive wire 36 ensuring that electrical continuity is maintained between the second linkage and the un-fixed caliper 16A; a fourth conductive wire 38 ensuring that electrical continuity is maintained between the un-fixed caliper and its fulcrum 18A; and a fifth conductive wire 40 ensuring that electrical continuity is maintained between the fulcrum and the fixed caliper 14A which is electrically connected to chassis ground. The segment of the secondary conductive loop that actually passes through the transformer is illustrated to be the second linkage 22A.

The braking system of the right wheel as depicted in FIG. 1 is heated with a slightly different circuit. An alternating voltage source 26B is in electrical communication serially with the primary windings 28B of a transformer having a core 30B. The caliper levers 14B and 16B are in electrical communication with their associated fulcrum 18B as in the left side. The first and second metal coupling linkages, 22B and 24B are electrically connected as on the left side. The difference between the left and right side lies in the fact that the linkage 22B does not pass through the core of the transformer, but rather in electrical current conduit 42 comprising of the secondary winding of the transformer, one end being electrically connected to the linkage 24B and the other end being electrically connected to the lever 16B.

In operation, a voltage is applied to the primary of the transformer causing current through its primary windings. This causes a current to be induced into the secondary winding, which is a one-turn high-current low-voltage circuit, by means of well known transformer induction principles. Since it is a stepdown transformer, a current gain is felt in the secondary. By proper selection of the primary winding count, the core material of the transformer, and the voltage levels, the current gain can be on the order of hundreds of amperes, enough to generate heat when opposed by the inherent resistivity of the secondary segments, i.e. the linkages and the caliper. The high current will generate heat by the resistive losses close to the surface of the metal due to the skin effect, which concentrates the current to the surface at high frequency.

For the purpose of system design the electrical impedance of a cylindrical metal bar is calculated by means by Bessel-type differential equations. The electrical impedance of a solid cylindrical bar is as follows:

$$Z = R + j\omega L = \frac{Hl}{2\pi a} \rho(1 + j) \text{ ohm}$$

$$\text{where } H = \sqrt{\frac{0.5 \omega \mu \mu_o}{\rho}}$$

$a$ = radians  $\omega = 2\pi f (f = \text{frequency in Hz})$
$l$ = length  $\mu$ = relative permeability
$\rho$ = specific resistivity  $\mu_o = 4\pi \times 10^{-7}$ This formula is valid for large $H \times a$.

For comparison the DC resistance is:

$$R_o = \frac{1}{\pi a^2} \rho \text{ ohm}$$

A solid iron bar was theoretically analyzed and tested as follows:

| | |
|---|---|
| $a = 0.9525$ cm | $f = 60$ hz |
| $l = 0.67$ m | $\mu = 815$ |
| $Q = 0.119 \times 10^{-6}$ ohm m | |
| which yields: | $Z = 2.399677 \times 10^{-3}$ ohm, and |
| | $R_o = 0.002797 - 10^{-3}$ ohm. |
| The measured data was: | |
| $I = 250$ A (amperes) | |
| $V = 0.6$ V (volts) | |

-continued $S = VI = 150$ VA (complex power)
$P = S \cos \theta = 150 (0.707) = 106$ W The bar could maintain an estimated 75° C. temperature and showed a considerable heat capacity.

Several variations of applications of this invention can be used depending on the linkage systems. For example, the brake blocks themselves could be heated separately.

Figure 2:
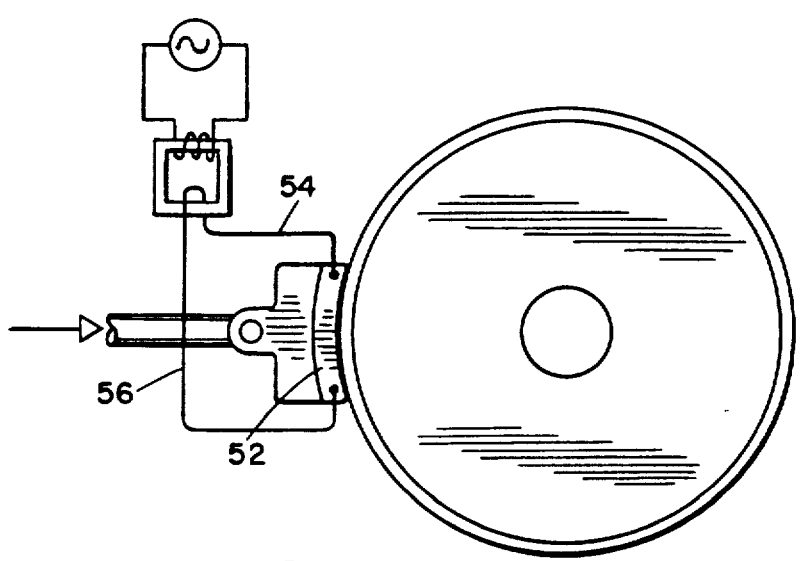
FIG. 2 illustrates application of this invention to a block braked wheel.

Referring to FIG. 2, a metal brake block 52 is illustrated to be a segment of the secondary winding. Other parts of the railroad car could also be heated by means for this principle. In order to have as high over-all efficiency as possible, the low voltage connecting cables, 54 and 56, should be as short as possible.

Figure 3:
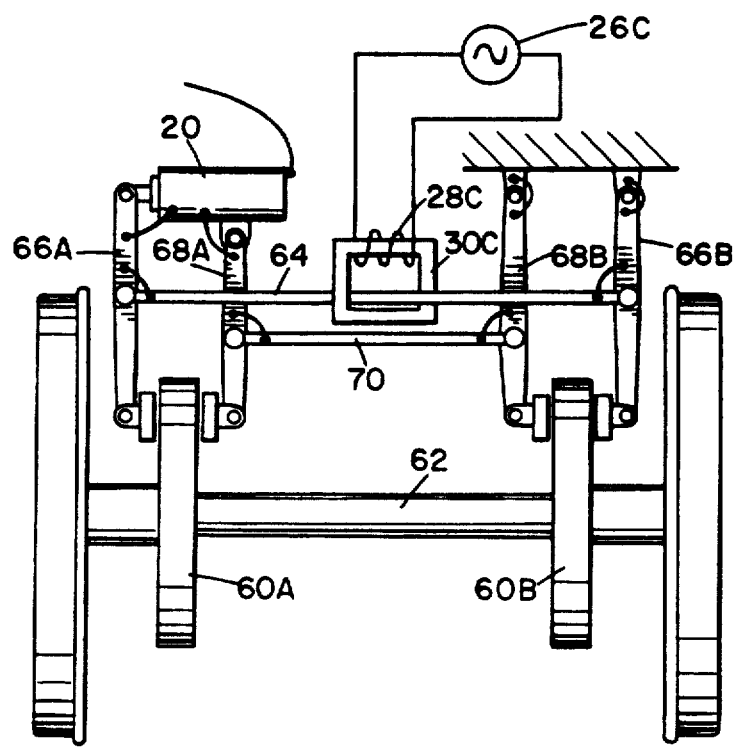
FIG. 3 illustrates application of this invention to linkage between disc brakes applied to the axle of the wheels.

Referring to FIG. 3, the braking system for the wheels operates under the disk brake principle, but is different from the system as depicted in FIG. 1. Disks 60A on the left and 60B on the right illustrate braking disks affixed to the axle 62 of the wheels, the disks being near their respective wheels. An alternating energy source 26C provides energy to the primary windings 28C of a transformer having a core 30C. Through the core is a linking rod 64 mechanically linked and electrically connected to caliper levers 66A and 66B. The secondary circuit comprises that linkage 64 as one segment, the upper portion of caliper 66B which is mechanically and electrically connected to chassis ground, through chassis ground, through an upper portion of a caliper 68B which is also electrically and mechanically connected to chassis ground, through a second linkage 70 which is mechanically and electrically connected to lever 68B and 68A, through the upper portion of 68A, through the shell of the ram 20, through the upper portion of lever 68A, and to the linkage 64 again. In this fashion, both the first and second linkages, and all of the caliper levers are warmed by the current flowing in that secondary loop induced therein by the primary of a transformer 28C.

Figure 4:
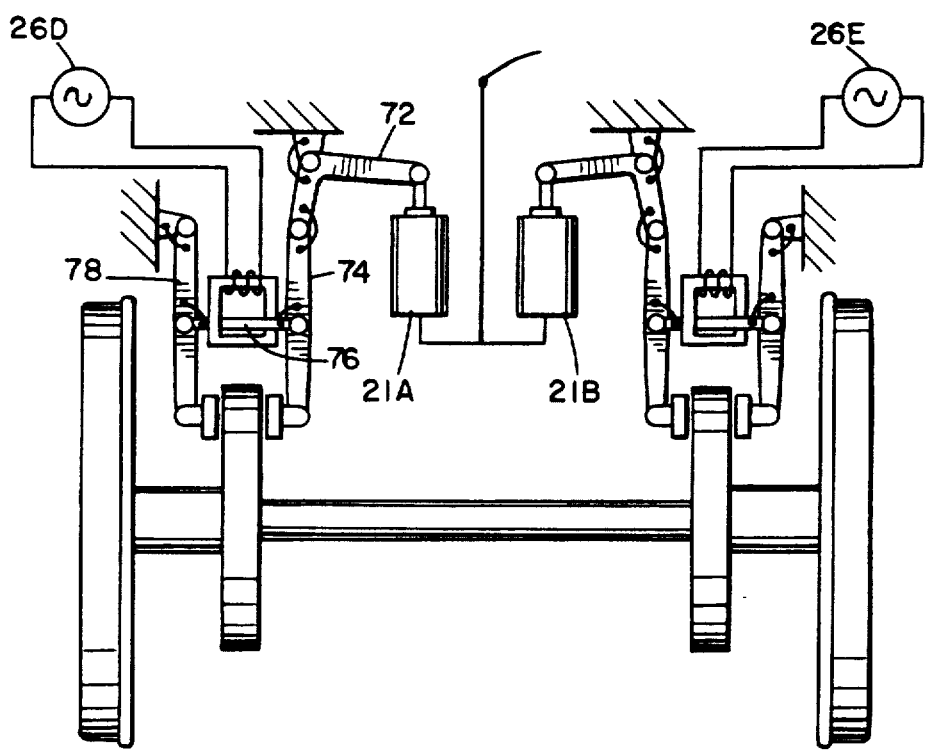
FIG. 4 illustrates application of this invention to the fulcrums of disc brakes affixed to the axle of the wheels.

Referring to FIG. 4, the same type disk system as illustrated in FIG. 4 is shown except with two driving rams 21A and 21B. Two sources of electrical energy 26D and 26E, left and right respectively, are utilized. The secondary loops of the transformers associated with said electrical energy sources are mirror images of each other. So the discussion will be provided only for the left braking mechanism. The secondary loop of the transformer on the left comprises a segment of an elbow 72 which mechanically pivots and is electrically connected to chassis ground. An end of the elbow remote from the ram is mechanically connected and electrically connected to a caliper lever 74. Which in turn is pivotally and electrically connected to a fulcrum arm 76 which passes through the core of the transformer and is the secondary winding. The opposite end of the fulcrum are is mechanically and electrically connected to the opposing lever of the caliper 78 which in turn is mechanically and electrically connected to the chassis ground, the chassis ground providing the last link in the loop. The configurations in both FIGS. 3 and 4 do not require any cables if electrical continuity can be maintained through the linkages' interfaces.

It is necessary to have flexible connections between the moving parts in order to have good electrical contact between the metal parts and to avoid them being welded together. (A few hundred amperes are to be expected.) In order to optimize the operating cost, a control system should be used with temperature sensors and switches operating such that heating takes place only below freezing temperatures, or if so desired, only during intermittent periods. The transformers should also be designed such that they have minimum leakage.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A system for generating heat within a control portion of a vehicle in order to inhibit freeze-up of said control portion due to icing and in order to de-ice said control portion, said system for generating heat comprising:
   (a) at least one control linkage that is electrically conductive, said at least one control linkage being a functioning element of said control portion,
   (b) means for connecting said at least one control linkage as a serial member of an electric circuit loop, and
   (b) means for causing an alternating electric current in said electric circuit loop of sufficient frequency to cause at least a majority of current in said at least one control linkage to be constricted at or near the surface of said at least one control linkage, the current being of sufficient magnitude in relation to an inherent resistivity of said at least one control linkage due to skin effect to generate a desired amount of heat at or near said surface of said at least one control linkage.

2. The system according to claim 11 wherein said means for causing an alternating electric current comprises:
   (a) a source of electrical energy which travels along with said vehicle, and
   (b) means for transforming the electrical energy into said alternating electric current.

3. The system according to claim 2 wherein said means for transforming the electrical energy into said alternating electric current comprises an electrical transformer, the electrical energy being applied to a primary winding of said transformer, and wherein said at least one control linkage is a serial member of an electric circuit loop of a secondary winding of said transformer.

4. The system according to claim 3 wherein said secondary winding is a single turn.

5. A system for generating heat within a vehicle's braking system in order to inhibit freeze-up of said braking system and in order to de-ice said braking system, said system for generating heat comprising:
   (a) at least one control linkage that is electrically conductive, said at least one control linkage being a functioning element of said braking system,
   (b) means for connecting said at least one control linkage as a serial member of an electric circuit loop, and
   (b) means for causing an alternating electric current in said electric circuit loop of sufficient frequency to cause at least a majority of current in said at least one control linkage to be constricted at or near the surface of said at least one control linkage, the current being of sufficient magnitude in relation to an inherent resistivity of said at least one control linkage due to skin effect to generate a desired amount of heat at or near said surface of said at least one control linkage.

6. The system for generating heat according to claim 5 wherein said means for causing an alternating electric current comprises:
   (a) a source of electrical energy which travels along with said vehicle, and
   (b) means for transforming the electrical energy into said alternating electric current.

7. The system for generating heat according to claim 6 wherein said means for transforming the electrical energy into said alternating electric current comprises an electrical transformer, the electrical energy being applied to a primary winding of said transformer, and wherein said at least one control linkage is a serial member of an electric circuit loop of a secondary winding of said transformer.

8. The system for generating heat according to claim 7 wherein said secondary winding is a single turn.

9. The system for generating heat according to claim 5 wherein said braking system includes disk brake calipers and wherein said at least one control linkage comprises a disk brake caliper lever.

10. The system for generating heat according to claim 5 wherein said braking system includes disk brakes and wherein said at least one control linkage comprises a disk brake fulcrum.

11. The system for generating heat according to claim 5 wherein said at least one control linkage comprises a braking system coupling linkage.

12. The system for generating heat according to claim 5 wherein said at least one control linkage comprises a brake shoe means for applying friction to a rim of a vehicle wheel.

* * * * *

UNITED STATES PATENT AND TRADEMARK OFFICE
CERTIFICATE OF CORRECTION

PATENT NO. : 5,266,773  
DATED : November 30, 1993  
INVENTOR(S) : Bertil S.M. Granborg Page 1 of 3

It is certified that error appears in the above-indentified patent and that said Letters Patent is hereby corrected as shown below:

In column 3, line 38, please replace "by" with --of--.

In column 3, line 42 please replace the following equation:

$$" \ Z = R + j\omega L = \frac{H\,l}{2\pi\alpha}\rho(1+j) \ \ ohm \ "$$

with the following equation:

$$-- \ Z = R + j\omega L = \frac{H\,l}{2\pi\alpha}\rho(1+j) \ \ ohm \ --$$

In column 3, line 49, replace "a = radians" with --a = radius--.

In column 3, line 55 please replace the following equation:

$$R_o = \frac{1}{\pi\alpha^2}\rho \ \ ohm$$

with the following equation:

$$\ldots R_o = \frac{1}{\pi\alpha^2}\rho \ \ ohm$$

UNITED STATES PATENT AND TRADEMARK OFFICE
CERTIFICATE OF CORRECTION

PATENT NO. : 5,266,773
DATED : November 30, 1993
INVENTOR(S) : Bertil S.M. Granborg It is certified that error appears in the above-indentified patent and that said Letters Patent is hereby corrected as shown below:

In column 3, line 64, please replace the following:

"$Q = 0.119 \times 10^{-6}$"

with the following:

--$\rho = 0.119 \times 10^{-6}$--.

In column 3, line 65, please replace the following:

"$R_o = 0.002797 - 10^{-3}$"

with the following:

--$R_o = 0.2797 \times 10^{-3}$--.

UNITED STATES PATENT AND TRADEMARK OFFICE
CERTIFICATE OF CORRECTION

PATENT NO. : 5,266,773
DATED : November 30, 1993
INVENTOR(S) : Bertil s.M. Granborg It is certified that error appears in the above-indentified patent and that said Letters Patent is hereby corrected as shown below:

In Column 4, line 15, please replace "for" with --of--.

In column 5, line 37, please replace "11" with --1--.

Signed and Sealed this

Sixteenth Day of May, 1995

*Attest:*

BRUCE LEHMAN

*Attesting Officer*     Commissioner of Patents and Trademarks